(12) United States Patent
Thomsen

(10) Patent No.: US 8,198,976 B2
(45) Date of Patent: Jun. 12, 2012

(54) FLEXIBLE THIN METAL FILM THERMAL SENSING SYSTEM

(75) Inventor: Donald Laurence Thomsen, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 248 days.

(21) Appl. No.: 12/688,309

(22) Filed: Jan. 15, 2010

(65) Prior Publication Data

US 2010/0118916 A1    May 13, 2010

Related U.S. Application Data

(63) Continuation-in-part of application No. 11/465,503, filed on Aug. 18, 2006, now Pat. No. 7,649,439.

(51) Int. Cl.
*H01C 7/02* (2006.01)
(52) U.S. Cl. ............ 338/25; 338/20; 428/670; 428/672
(58) Field of Classification Search ............... 338/20–25; 428/670–674, 607, 333–336, 458
See application file for complete search history.

(56) References Cited

U.S. PATENT DOCUMENTS

| | | | |
|---|---|---|---|
| 3,601,693 A | 8/1971 | Lorentzen | |
| 4,078,096 A | 3/1978 | Redmond et al. | |
| 5,869,130 A | 2/1999 | Ferrier | |
| 6,019,926 A | 2/2000 | Southward et al. | |
| 6,294,220 B1 | 9/2001 | McGrath et al. | |
| 6,589,593 B1 | 7/2003 | Hupe et al. | |
| 6,746,751 B2 | 6/2004 | Lamotte et al. | |
| 6,815,326 B2 | 11/2004 | Asai et al. | |
| 6,958,308 B2 | 10/2005 | Brown | |
| 2005/0119390 A1 | 6/2005 | Gaddy et al. | |
| 2007/0237977 A1 | 10/2007 | Thomsen et al. | |

OTHER PUBLICATIONS

Frederick A. Lowenhein, Electroplating, McGraw-Hill Book Company, New York City, Chapter 17, 1978, pp. 389-409.
R.E. Southward, et al., "Inverse CVD: A Novel Synthetic Approach to Metallized Polymeric Films", Advanced Materials, 1999, 11, No. 12, pp. 1043-1047.

*Primary Examiner* — Kyung Lee
(74) *Attorney, Agent, or Firm* — Thomas K. McBride, Jr.; Helen M. Galus

(57) ABSTRACT

A flexible thin metal film thermal sensing system is provided. A thermally-conductive film made from a thermally-insulating material is doped with thermally-conductive material. At least one layer of electrically-conductive metal is deposited directly onto a surface of the thermally-conductive film. One or more devices are coupled to the layer(s) to measure an electrical characteristic associated therewith as an indication of temperature.

12 Claims, 2 Drawing Sheets

FLEXIBLE THIN METAL FILM THERMAL SENSING SYSTEM

RELATED APPLICATIONS

This application is a continuation-in-part of the pending application Ser. No. 11/465,503, filed Aug. 18, 2006 now U.S. Pat. No. 7,649,439.

ORIGIN OF THE INVENTION

The invention was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to thin metal films. More specifically, the invention is a flexible thin metal film thermal sensing system.

2. Description of the Related Art

Electrically-based thermal sensing is typically accomplished using a thermocouple or resistance temperature device (RTD). A thermocouple is a passive device made out of wire or a metal film deposited on an insulative substrate. Wire thermocouples are relatively inflexible thereby making them a poor choice when the sensor must be wrapped about or otherwise conformed to the shape of a structure. Metal film-based thermocouples are typically made by thermal evaporation or sputtering of a metal film onto a dielectric surface, e.g., a plastic.

RTDs are active devices in that an electric current must be supplied thereto with a resulting electrical resistance being read therefrom. The electrical resistance is indicative of temperature. RTDs are typically made from metal foils that are thicker and less flexible than a metal film thermocouple. Accordingly, RTDs may not be suitable choices for temperature sensing applications requiring relatively small and flexible temperature sensors.

SUMMARY OF THE INVENTION

Accordingly, it is an object of the present invention to provide a flexible thin metal film thermal sensing system.

Another object of the present invention is to provide a flexible thin metal film thermal sensing system adaptable for operation as a passive thermocouple or an active RTD.

Other objects and advantages of the present invention will become more obvious hereinafter in the specification and drawings.

In accordance with the present invention, a flexible thin metal film thermal sensing system includes a thermally-conductive film made from a thermally-insulating material doped with thermally-conductive material. At least one layer of electrically-conductive metal is deposited directly onto a surface of the thermally-conductive film. One or more devices are coupled to the layer(s) to measure an electrical characteristic associated therewith as an indication of temperature.

DETAILED DESCRIPTION OF THE INVENTION

Figure 1:
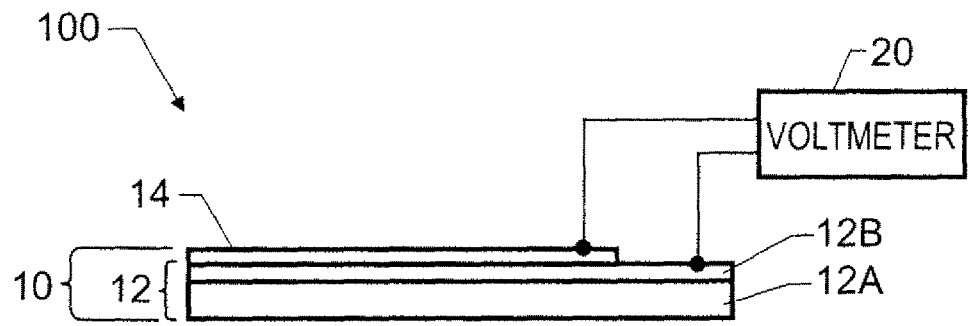
FIG. 1 is a schematic view of a flexible thin metal film thermal sensing system in accordance with an embodiment of the present invention.

Referring now to the drawings, and more particularly to FIG. 1, an embodiment of a flexible thin metal film thermal sensing system is shown and is referenced generally by numeral 100. Thermal system 100 is a passive thermoelectric device in that it requires no applied excitation voltage or current. Thermal system 100 is based on a flexible thin metal film system 10 previously disclosed in U.S. patent application Ser. No. 11/279,009, filed Apr. 7, 2006, the contents of which are hereby incorporated by reference. Flexible thin metal film system 10 obtains its flexibility from a self-metallized polymeric film base 12 that, in general, has an underlying sheet 12A of polymeric material with a surface layer 12B that is a conductive metal. In general, the structure of self-metallized polymeric film 12 is created/developed in one or more processing stages. Conventional two-stage processing involves preparing/fabricating polymer sheet 12A and then depositing surface layer 12B onto sheet 12A. However, absent a pretreatment process, there will be adhesion problems between sheet 12A and surface layer 12B.

The adhesion between sheet 12A and metal surface layer 12B is greatly improved if self-metallized polymeric film 12 is created/developed by single-stage processing of, for example, a homogenous solution of a native metal precursor (as a positive valent metal complex) and a selected poly(amic acid) precursor of the final polymer. Single-stage thermal or light processing simultaneously causes the polymer to form while most of the metal atoms aggregate at the surface of the polymer in a very thin layer on the order of about 500-2000 Angstroms (Å) in thickness. Such single-stage processing is disclosed by R. E. Southward et al., in "Inverse CVD: A Novel Synthetic Approach to Metallized Polymeric Films," Advanced Materials, 1999, 11, No. 12, pp 1043-1047, the contents of which are hereby incorporated by reference as if set forth in its entirety.

The resulting self-metallized polymeric film 12 is flexible and does not suffer from the aforementioned adhesion problems. As a result of such single-stage processing, underlying sheet 12A retains some of the metal atoms (i.e., the same metal forming surface layer 12B) so that underlying sheet 12A possesses thermal conductivity while metal surface layer 12B is electrically conductive. Accordingly, as will be readily apparent from the ensuing description, underlying sheet 12A can be coupled to a structural surface (not shown) when the temperature thereof is to be measured. Further, since thin metal film system 10 is flexible, it can be easily conformed to the shape of the structural surface.

Flexible thin metal film system 10 further includes a layer 14 (or multiple layers) of electrically conductive metal directly deposited onto surface layer 12B. Further, in at least one embodiment of the present invention, metal layer 14 is deposited directly onto surface layer 12B without any adhesion pretreatment of layer 12B. Additionally, in at least one embodiment, metal layer 14 can comprise multiple sub-layers, wherein the first sub-layer is directly deposited onto the surface layer 12B, and each sub-layer may comprise the same or different electrically conductive metals.

In other words, surface layer 12B serves as a strike layer for metal layer 14 that is deposited onto surface layer 12B by one of a variety of electrodeposition methods to include electroplating. However, it is to be understood that layer 14 could also be deposited directly onto surface layer 12B by means of a variety of electroless deposition/plating techniques without departing from the scope of the present invention. For a description of electroless plating techniques, see Chapter 17 of "Electroplating" by Frederick A. Lowenheim, McGraw-Hill Book Company, New York, 1978. Still other techniques for depositing metal layer 14 include, for example, immersion or displacement plating, chemical reduction deposition such as silvering, thermal evaporation, sputtering and chemical vapor deposition. Thin metal film systems fabricated in this fashion are typically on the order of 0.05 to 1 micron in thickness. By comparison, metal foil RTDs are considerably thicker, i.e., typically 4-50 microns in thickness.

As shown in FIG. 1, coupled to flexible thin metal film system 10 is a voltmeter 20. More specifically, as shown, voltmeter 20 has its leads 22 coupled to metal surface layer 12B and metal layer 14 where the choice of either as an anode or cathode is not a limitation of the present invention. A voltage difference measured by voltmeter 20 is indicative of temperature experienced by thin metal film system 10. Thermal system 100 can be calibrated by measuring voltages (i.e., the Seebeck voltage) at known temperature intervals with the recorded voltages and known temperatures being used to determine the equation of a line with the slope thereof being the Seebeck Coefficient.

Figure 2:
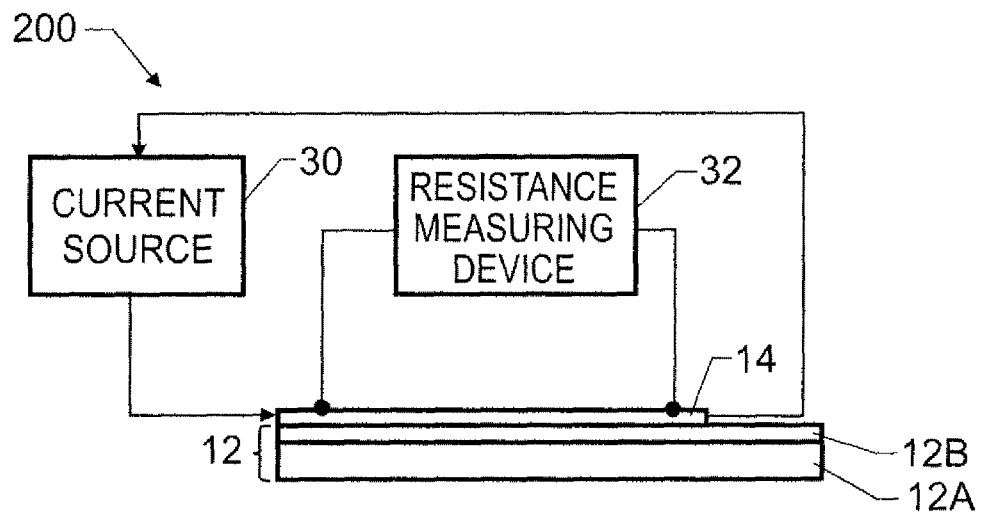
FIG. 2 is a schematic view of a flexible thin metal film thermal sensing system in accordance with another embodiment of the present invention.
Figure 3:
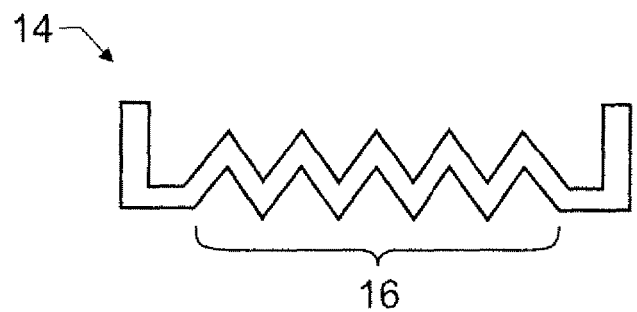
FIG. 3 is plan view of an example of a patterned metal layer forming an electrical resistance element.

The present invention can also be adapted/configured to function as an active resistance temperature device (RTD) as will now be explained with the aid of FIGS. 2 and 3. In FIG. 2, flexible thin metal film thermal sensing system 200 utilizes a flexible thin metal film system similar to that described above. The difference is that metal layer 14 is shaped, formed or etched to define a pattern 16 (FIG. 3) that exhibits changes in electrical resistance in correspondence with changes in temperature. In operation of thermal sensing system 200, electric current is supplied to metal layer 14 by a current source 30 while the electrical resistance of pattern 16 is measured by a resistance measuring device 32 electrically coupled across pattern 16.

The advantages of the present invention are numerous. The flexible thin metal film thermal sensing systems of the present invention overcome the comparatively inflexible prior art thermocouples and RTDs. In addition, since the underlying polymeric sheet is thermally conductive, these thermal sensing systems have improved response characteristics and are well suited to sense temperatures of structures to which they are coupled as they do not require doping with thermally conductive materials.

The present invention can be made using a variety of self-metallized polymeric films. Referring again to FIGS. 1 and 2, metal surface layer 12B of self-metallized polymeric film 12 as well as metal layer 14 can be selected from the group of metals to include palladium, platinum, gold, silver, nickel, copper, tantalum, tin, lead, mercury, iron, manganese, aluminum, silicon, rhodium, chromium, cobalt, indium, magnesium, molybdenum, rhenium. Alloys of these metals and some oxides (e.g., indium tin oxide) could also be used. Accordingly, as used herein in the description and claims, metal layer 14 refers to metals and alloys or oxides thereof. Furthermore, the metal for surface layer 12B need not be the same as the metal used for metal layer (or multiple layers) 14.

Figure 4:
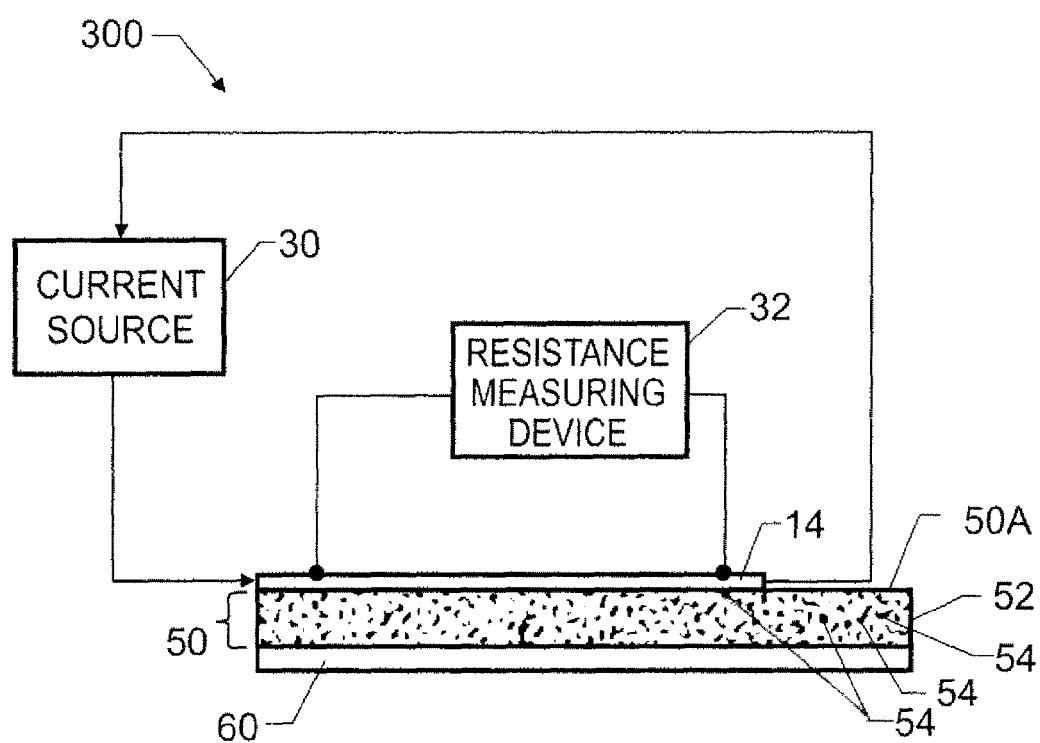
FIG. 4 is a schematic view of a flexible thin metal film thermal sensing system in accordance with another embodiment of the present invention.

Although the invention has been described relative to specific embodiments thereof, there are numerous variations and modifications that will be readily apparent to those skilled in the art in light of the above teachings. For example, the self-metallized polymeric film described herein could be replaced by another thermally-conductive film that supported a layer/pattern of metal thereon. More specifically, FIG. 4 illustrates a flexible thin metal film sensing system 300 that utilizes a thermally-conductive film 50 defined by a thermally non-conductive (or insulating) material 52 that has been doped with a dispersed thermally-conductive material 54 such that some of material 54 is exposed at a surface 50A of film 50. Material 52 can be, for example, a variety of polyimides (to include soluble polyimides such as LaRC™ SI, U.S. Pat. Nos. 5,639,850, 5,741,883 and 6,048,959), a variety of polyesters (e.g., polyethyleneterephthalate, polycyclohexylenedimethylene terephthalate, and MYLAR), a variety of nylons, or a polyetherimide (e.g., General Electric's ULTEM). Material 54 can be, for example, a variety of "particle" or "powder" materials to include one or more of colloidal metals, metal tubules, ceramics (e.g., beryillium oxide, aluminum nitride, aluminum oxide and zinc oxide), carbon black, carbon nanotubes, carbon whiskers, carbon fibers, carbon nanofibers, graphite, and graphene. Similar to system 200 described above, flexible thin metal film thermal sensing system 300 utilizes metal layer 14 deposited directly onto surface 50A of film 50 with layer 14 being shaped, formed or etched to define a pattern (e.g., pattern 16 illustrated in FIG. 3) that exhibits changes in electrical resistance in correspondence with changes in temperature. In operation of thermal sensing system 300, electric current is supplied to metal layer 14 by a current source 30 and the electrical resistance of layer 14 (or the portion thereof defining a resistance pattern) is measured by a resistance measuring device 32.

Sensing system 300 can optionally include a thermally-conductive adhesive 60 that bonds to film 50 and is used to couple/bond system 300 to a structural surface of interest (not shown). Adhesive 60 can be a thermally-conductive pressure sensitive adhesive, a thermally-conductive epoxy, a thermally-conductive hot melt adhesive, or even a thermally-conductive grease. In each case, the base adhesive can be doped with thermally-conductive materials such as those specified above for material 54.

While the present invention has been described with respect to electroplating and electroless plating fabrication techniques and materials associated therewith, the present invention is not so limited. Other metals and associated fabrication techniques (e.g., thermal evaporation, sputtering, etc.) could also be used to construct thermal sensing systems in accordance with the present invention. These alternative fabrication methods could be used to deposit pure metals such as iron, silver, gold, copper, cobalt, nickel, manganese, magnesium, aluminum, silicon, platinum, rhodium, indium, molybdenum, rhenium, tin, tungsten and chromium, as well as alloys thereof such as constantan (55% copper, 45% nickel), alumel (95% nickel, 2% manganese, 2% aluminum, 1% silicon), chromel (90% nickel, 10% chromium), nichrome (80% nickel, 20% chromium), nicrosil (84.1% nickel, 14.4% chromium, 1.4% silicon and 0.1% magnesium), nisil (95.6% nickel, 4.4% silicon), indium tin oxide, as well as various formulations of platinum-rhodium, nickel-molybdenum, chromel-gold, platinum-rhenium and tungsten-rhenium. Additionally, FIG. 3 shows one example of a pattern 16 that exhibits changes in electrical resistance in correspondence with changes in temperature, other such patterns are within the scope of the present invention. It is therefore to be understood that, within the scope of the appended claims, the invention may be practiced other than as specifically described.

What is claimed as new and desired to be secured by Letters Patent of the United States is:

1. A flexible thin metal film thermal sensing system, comprising:
   a thermally-conductive film developed from single-stage processing of a thermally-insulating material doped with thermally-conductive material;
   at least one layer shaped to define an electrically resistive pattern of electrically-conductive metal deposited directly onto a surface of said thermally-conductive film;
   a resistance measuring device coupled to said pattern for measuring an electrical characteristic associated therewith as an indication of temperature; and
   an electrical source for supplying a current to said pattern.

2. A flexible thin metal film thermal sensing system as in claim 1 wherein said thermally-insulating material is selected from the group consisting of polyimides, polyesters, nylons, and polyetherimides.

3. A flexible thin metal film thermal sensing system as in claim 1 wherein said thermally-conductive material is selected from the group consisting of colloidal metals, metal tubules, ceramics, carbon black, carbon nanotubes, carbon whiskers, carbon fibers, carbon nanofibers, graphite, and graphene.

4. A flexible thin metal film thermal sensing system as in claim 1 wherein said at least one layer is selected from the group consisting of indium tin oxide, palladium, platinum, gold, silver, nickel, copper, tantalum, tin, lead, mercury, iron, manganese, aluminum, silicon, rhodium, chromium, cobalt, indium, magnesium, molybdenum, rhenium, and alloys thereof.

5. A flexible thin metal film thermal sensing system as in claim 1 wherein said at least one layer comprises at least two sub-layers, each sub-layer being selected from the group consisting of indium tin oxide, palladium, platinum, gold, silver, nickel, copper, tantalum, tin, lead, mercury, iron, manganese, aluminum, silicon, rhodium, chromium, cobalt, indium, magnesium, molybdenum, rhenium, and alloys thereof.

6. A flexible thin metal film thermal sensing system as in claim 1 further comprising a thermally-conductive adhesive bonded to said thermally-conductive film.

7. A flexible thin metal film thermal sensing system, comprising:
   a film of thermally-insulating material with thermally-conductive materials dispersed therein and exposed at a surface thereof;
   at least one layer shaped to define an electrically resistive pattern of electrically-conductive material deposited directly onto said surface;
   a resistance measuring device coupled to said pattern for measuring an electrical characteristic associated therewith as an indication of temperature thereof; and
   an electrical source for supplying a current to said pattern.

8. A flexible thin metal film thermal sensing system as in claim 7 wherein said thermally-insulating material is selected from the group consisting of polyesters, nylons, and polyetherimides.

9. A flexible thin metal film thermal sensing system as in claim 7 wherein said thermally-conductive materials are selected from the group consisting of colloidal metals, metal tubules, ceramics, carbon back, carbon nanotubes, carbon whiskers, carbon fibers, carbon nanofibers, graphite, and gaphene.

10. A flexible thin metal film thermal sensing system as in claim 7 wherein said at least one layer is selected from the group consisting of indium tin oxide, palladium, platinum, gold, silver, nickel, copper, tantalum, tin, lead, mercury, iron, manganese, aluminum, silicon, rhodium, chromium, cobalt, indium, magnesium, molybdenum, rhenium, and alloys thereof.

11. A flexible thin metal film thermal sensing system as in claim 7 wherein said at least one layer comprises at least two sub-layers, each sub-layer being selected from the group consisting of indium tin oxide, palladium, platinum, gold, silver, nickel, copper, tantalum, tin, lead, mercury, iron, manganese, aluminum, silicon, rhodium, chromium, cobalt, indium, magnesium, molybdenum, rhenium, and alloys thereof.

12. A flexible thin metal film thermal sensing system as in claim 7 tamer comprising a thermally-conductive adhesive bonded to said film.

* * * * *